G. W. PROUTY.
Printing-Presses.
No. 5,664. Reissued Nov. 18, 1873.
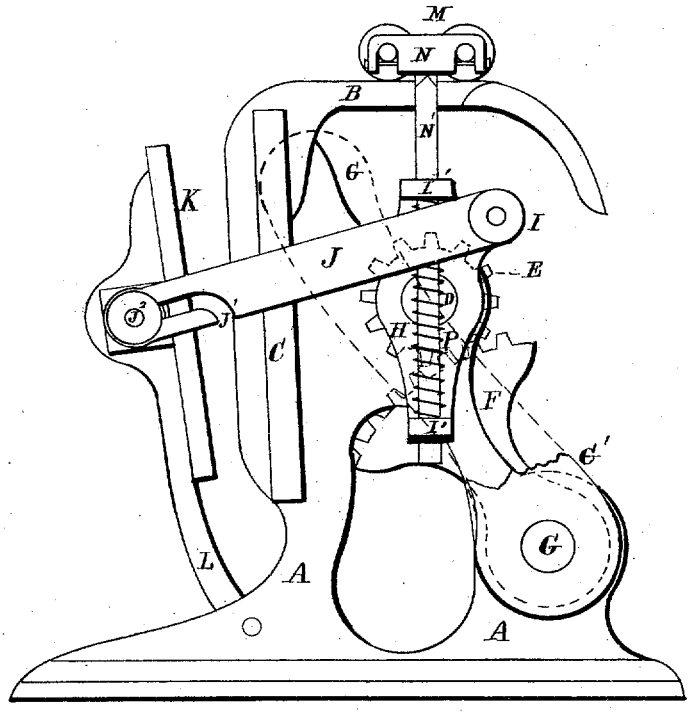
Witnesses.
G. E. Whitney.
S. A. Wood.
Inventor.
George W. Prouty
AM. PHOTO-LITHOGRAPHIC Co. N.Y. (OSBORNE'S PROCESS)

UNITED STATES PATENT OFFICE.

GEORGE W. PROUTY, OF CHARLESTOWN, MASSACHUSETTS.

IMPROVEMENT IN PRINTING-PRESSES.

Specification forming part of Letters Patent No. 132,599, dated October 29, 1872; reissue No. 5,664, dated November 18, 1873; application filed October 20, 1873.

*To all whom it may concern:*

Be it known that I, GEORGE W. PROUTY, of Charlestown, in the county of Middlesex and State of Massachusetts, have invented a new and valuable Improvement in Printing-Presses; and I do hereby declare that the following is a full, clear, and exact description of the construction and operation of the same, reference being had to the annexed drawing making a part of this specification and to the letters and figures of reference marked thereon.

The drawing is a representation of a side view of my invention.

This invention has relation to printing-presses for small job-work; and consists in the novel construction and arrangement of the devices for operating the platen or inking-rollers, or platen and inking-rollers combined, and for coupling the same to the one driving-shaft, all as hereinafter more fully described.

In the drawing, A represents the side frame of the press; B, the ink-plate, supported at the top of the press; and C the type-bed, located at the front of the latter and arranged in a vertical position. D is a horizontal shaft, mounted in suitable bearings in the frames A, and having mounted thereon and secured thereto the pinion E, actuated by means of a toothed segment, F, mounted upon and secured to the main shaft G, to which the power for operating the press is applied by means of the lever G′, the larger part of which is shown in dotted lines. Upon the ends of the shaft D are arranged the peculiar crank-plates H, each furnished with a crank-arm, I, and with the two brackets, I′. To the crank-arms I are pivoted the pitmen J, connecting said crank-plates to the platen K, in order to transmit motion from one to the other when the shaft D is rotated. The platen is hinged to the lower part of the press-frame by means of the curved arms L. M represents the inking-rollers, journaled to the end plates N, to which are pivoted the rods N′, passing thence through the brackets I′, and encircled by the spiral springs P, so arranged as to keep the inking-rollers in contact with the type and ink-plate, and to allow them to freely adapt themselves to the peculiarities of form and arrangement of the type-bed and ink-plate.

As will be observed, the relative arrangement of the brackets I′ to the crank-arms I is such that the platen comes in contact with the type just when the inking-rollers have reached the limit of the ink-plate, and that the platen completes its reverse movement simultaneously with the arrival of the rollers to the lower edge of the type-bed. The ends of the pitmen J are constructed with curved open-ended slots $J^1$, in which the arms $J^2$ of the platen have their bearings. These slots are made in the form shown, so that the pitmen may be readily uncoupled from the platen, and the latter let down to a horizontal position for the better arrangement of work, and for other purposes.

It is evident that the segment F, pinion E, crank-plates H, and pitmen J, together with the shafts D and G, may be successfully used in combination for operating the platen K, when no inking-rollers are used, or when said inking-rollers are operated by an independent mechanism.

What I claim as new is—

1. The plates H, having the brackets I′ and side crank-sockets I, for the connecting of the platen and inking-rollers to the pinion-shaft through the medium of the pitmen J and rods N′, substantially as described.

2. The combination of the rocker-shaft G, the lever G′, the segment F, pinion E, shaft D, cranks I, and pitmen J, operating, as set forth, to impart motion to the platen K, substantially as described.

3. The combination of the segment F, pinion E, shaft D, plate H provided with the brackets I′, the rods N′, and springs P, operating to impart motion to the inking-rollers M, substantially as described.

4. The toothed segments F, engaging with the pinion E, and operating to transmit motion to the platen and inking-rollers through the medium of the shaft D, crank-plate H, pitmen J, and rods N′, or their equivalents, substantially as specified.

Executed at Boston, this 15th day of October, 1873.

GEORGE W. PROUTY.

Witnesses:

FRANCIS J. LIPPITT,
N. C. LOMBARD.